United States Patent
Jeon et al.

(10) Patent No.: US 7,826,843 B2
(45) Date of Patent: Nov. 2, 2010

(54) METHOD FOR SELECTING COMMUNICATION NETWORK BY WIRELESS TERMINAL

(75) Inventors: Cheol-Yong Jeon, Seoul (KR); In-Oh Chung, Suwon-si (KR); Sang-Jun Nam, Yongin-si (KR); Jae-Pil Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 883 days.

(21) Appl. No.: 11/704,147

(22) Filed: Feb. 8, 2007

(65) Prior Publication Data

US 2007/0201394 A1    Aug. 30, 2007

(30) Foreign Application Priority Data

Feb. 8, 2006    (KR) .................... 10-2006-0012289

(51) Int. Cl.
*H04W 4/00*    (2009.01)
(52) U.S. Cl. ................ 455/435.2; 455/552.1; 455/513; 370/318; 370/332
(58) Field of Classification Search ............. 455/426.1, 455/426.2, 435.1, 435.2, 436, 450, 455, 452.1, 455/452.2, 453.1, 513, 522, 512, 552.1, 553.1, 455/554.2, 555, 168.1; 370/318, 328, 338, 370/331, 329, 332
See application file for complete search history.

(56) References Cited

U.S. PATENT DOCUMENTS

| | | | |
|---|---|---|---|
| 7,596,120 B2 | 9/2009 | Kim et al. | |
| 2003/0060204 A1* | 3/2003 | Francl et al. | 455/446 |
| 2005/0068916 A1* | 3/2005 | Jacobsen et al. | 370/328 |
| 2005/0107107 A1* | 5/2005 | Shahidi et al. | 455/522 |
| 2005/0233749 A1* | 10/2005 | Karaoguz et al. | 455/442 |
| 2005/0239443 A1* | 10/2005 | Watanabe et al. | 455/414.1 |
| 2005/0281219 A1* | 12/2005 | Kim et al. | 370/328 |
| 2006/0067389 A1* | 3/2006 | Tounai et al. | 375/219 |
| 2006/0068783 A1* | 3/2006 | Arduini et al. | 455/435.1 |
| 2006/0205396 A1* | 9/2006 | Laroia et al. | 455/422.1 |
| 2006/0209869 A1* | 9/2006 | Kim et al. | 370/431 |
| 2007/0091852 A1* | 4/2007 | Malladi et al. | 370/332 |

FOREIGN PATENT DOCUMENTS

KR    1020060063620    6/2006

* cited by examiner

*Primary Examiner*—Jean A Gelin
(74) *Attorney, Agent, or Firm*—The Farrell Law Firm, LLP

(57) ABSTRACT

Disclosed is a method for selecting a communication network by a wireless terminal, the method including receiving a signal having a predetermined reception power level from one or more communication networks, and calculating a guaranteed data rate of each of said one or more communication networks by using the predetermined reception power level of the signal; comparing the calculated guaranteed datarate with a minimum guaranteed datarate; and calculating a selection factor value of each of said one or more communication networks by using the guaranteed datarate when all guaranteed datarate of said one or more communication networks are equal to or greater than the minimum guaranteed datarate, and selecting a communication network having a lowest selection factor value.

10 Claims, 3 Drawing Sheets

METHOD FOR SELECTING COMMUNICATION NETWORK BY WIRELESS TERMINAL

PRIORITY

This application claims the benefit under 35 U.S.C. 119 of an application entitled "Method For Selecting Communication Network By Wireless Terminal" filed in the Korean Intellectual Property Office on Feb. 8, 2006 and assigned Serial No. 2006-12289, the entire contents of which are incorporated herein by reference.

BACKGROUND OF THE INVENTION

1. Field of the Invention

The present invention relates to a method for effective network selection by a wireless terminal in a heterogeneous network environment, and more particularly to a method for a more efficient selection by a wireless terminal between a mobile communication network and a wireless local area network (WLAN) in a heterogeneous network environment.

2. Description of the Related Art

Conventional mobile communication networks are classified into a frequency division multiple access (FDMA) scheme, a time division multiple access (TDMA) scheme and a code division multiple access (CDMA) scheme according to their communication methods. The FDMA scheme allows each subscriber to use a frequency channel allocated a wireless terminal to by dividing the frequency band into a plurality of channels. The TDMA scheme allows a plurality of wireless terminals to use one frequency channel through time division. The CDMA scheme allows a plurality of wireless terminals to communicate through the same frequency band at the same time by using different codes allocated to the wireless terminals.

With the rapid development of communication technology, the current mobile communication networks have come to provide mobile terminals with a fast data service capable of transmitting mail, still pictures, and multimedia services such as moving pictures, as well as the conventional voice communication service. Third generation (3G) mobile communication systems capable of supporting both conventional voice communication service and packet service include a synchronous CDMA 2000 1x system and an asynchronous universal mobile telecommunication system (UMTS).

In addition, extensive research is being conducted into wireless networks, such as a WLAN, a wireless broadband Internet (WiBro) to provide a mobile Internet service using a frequency of 2.3 GHz, etc.

Connecting systems between the mobile communication network and the WLAN has have been developed, so that it is possible to efficiently provide a multimedia service. The $3^{rd}$ Generation Partnership Project (3GPP), which is a standardization organization for the mobile communication system, classifies the connecting systems into two types of systems according to a coupling point for the connection between the mobile communication network and the WLAN. One of the two types of connecting systems is a loosely-coupled system in which a WLAN is coupled to an interface between a gateway General Packet Radio (GPRS) support node (GGSN) and an external Internet Protocol (IP) Internet, and the other is a tightly-coupled system in which a WLAN is coupled to a serving GPRS support node (SGSN)/packet control function (PCF), which corresponds to a core network of a mobile communication network.

When a multimedia data service is provided by using the above-mentioned connecting systems between the mobile communication network and the WLAN, a wireless terminal performs selection between an interface of the mobile communication network and an interface of the WLAN. In this case, the wireless terminal selects either the interface of the mobile communication network or the interface of WLAN according to weight values of the interfaces.

The weight value of each interface is calculated by a sum of a power of a received signal from an accessible interface and a priority of the interface, which can be expressed by Equation (1)

$$W = 1000 \times PW + Pr \qquad (1)$$

In Equation (1), "W" represents the weight value of a corresponding interface, and "PW" represents a reception power. In addition, "Pr" represents the priority of the corresponding interface. The priorities of interfaces may differ depending on each wireless device. For example, in the case of a wireless terminal in which the main purpose is providing a voice service, a mobile communication network has a higher priority (e.g. 1000) than that (e.g. 800) of a WLAN.

When the wireless terminal selects and uses either the interface of the mobile communication network or the interface of the WLAN based on the weight values of the interfaces calculated using Equation (1), transmission of data may be delayed or interrupted because a difference between the available data rates of the heterogeneous networks has not been considered. In addition, there is a problem in that, even when the reception power from the WLAN is only slightly less than the reception power from the mobile communication network, the less expensive WLAN will not be selected but the more expensive mobile communication network will be selected.

SUMMARY OF THE INVENTION

Accordingly, the present invention has been made to solve the above-mentioned problems occurring in the prior art, and an aspect of the present invention is to provide a method for more efficient selection between a mobile communication network and a wireless local area network (WLAN) by a wireless terminal in a heterogeneous network environment.

To accomplish this and other aspects there is provided a method for selecting by a wireless terminal a communication network, the method including receiving a signal having a reception power from one or more communication networks; calculating a guaranteed data rate of each of said one or more communication networks by using the reception power of the signal; comparing the calculated guaranteed datarate with a minimum guaranteed data-rate; calculating a selection factor value of each of said one or more communication networks by using the guaranteed datarate when all guaranteed datarates of said one or more communication networks are equal to or greater than the minimum datarate; and selecting a communication network having a lowest selection factor value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the embodiment of the present invention, a detailed description of known functions and configurations incorporated herein will be omitted when it may obscure the subject matter of the present invention.

The following description will be described with respect to given with a tightly-coupled connecting system between a mobile communication network and a wireless local area network (WLAN) as an example.

Figure 1:
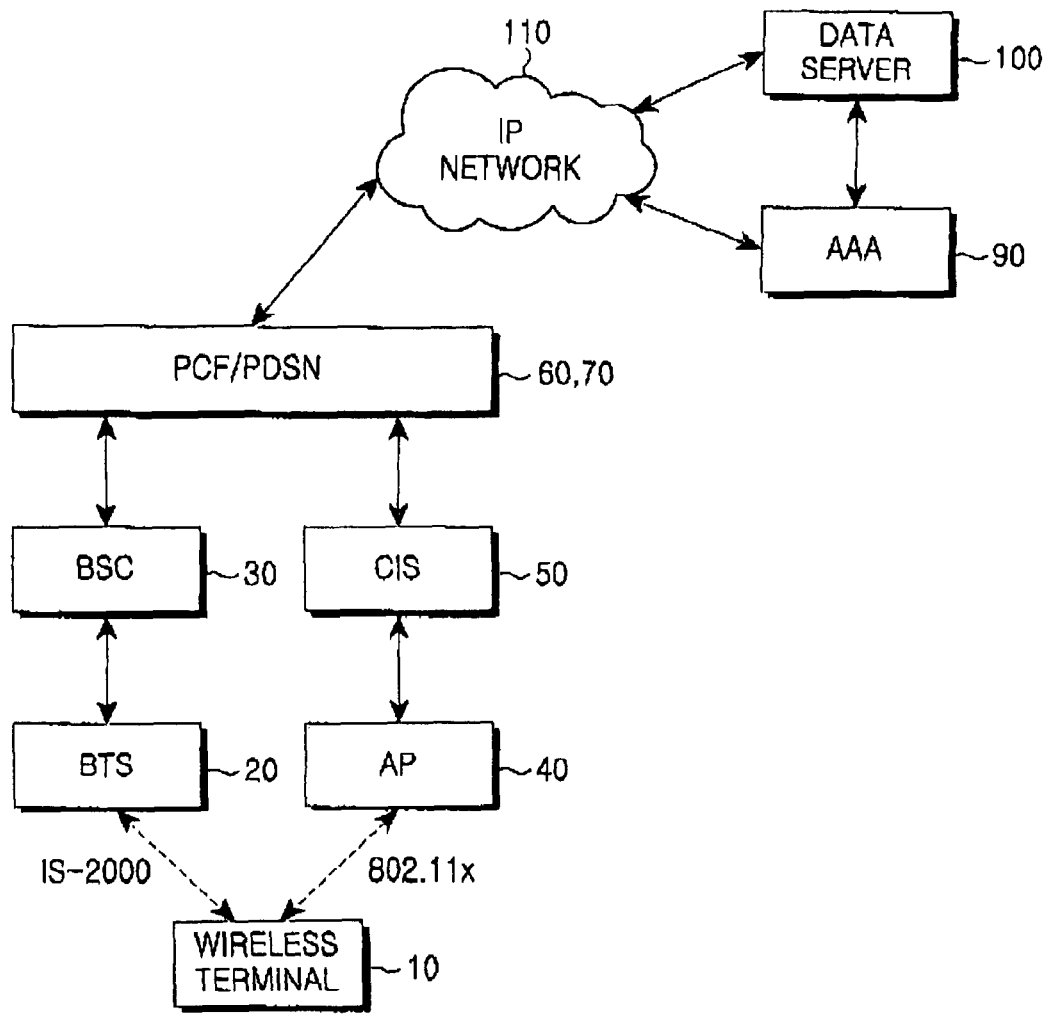
FIG. 1 is a block diagram illustrating the construction of a connecting system between different types of networks according to the present invention.

FIG. 1 is a block diagram illustrating the construction of a connecting system between different types of networks according to the present invention. The tightly-coupled system, which is a connecting system between a mobile communication network and a wireless local area network (WLAN), will now be described with reference to FIG. 1. The connecting system between the mobile communication network and WLAN includes a wireless terminal 10, a base transceiver subsystem (BTS) 20, a base station controller (BSC) 30, an access point (AP) 40, a CDMA2000 interworking server (CIS) 50, a packet control function (PCF) 60, and a packet data service node (PDSN) 70. The CIS 50 is also referred to as the connecting server.

The wireless terminal 10 performs selection between the interface of the mobile communication network and the interface of the WLAN. The wireless terminal 10 performs a point-to-point (PPP) access when accessing the mobile communication network, but does not perform a point-to-point (PPP) access when accessing the WLAN. The wireless terminal 10 also locates the CIS 50 for connecting between the mobile communication network and the WLAN. In addition, the wireless terminal 10 selects between the interface of the mobile communication network and the interface of the WLAN based on a minimum guaranteed datarate and/or information about an average cost "COSTi" per packet.

The base transceiver subsystem 20 is a land station in the mobile communication network, and includes a transceiving apparatus and an antenna, and performs a wireless interfacing with a wireless terminal. The base transceiver subsystem 20 also transmits a signal of a supportable reception power to the wireless terminal 10.

The base station controller 30 provides a physical link and a control function between the base transceiver subsystem 20 and the wireless terminal 10 located in the mobile communication network. The base station controller 30, which is a high-performance telephone exchange, provides a handoff function and a cell construction function, and controls the base transceiver subsystem to output a wireless frequency. A combination of the base transceiver subsystem 20 and the base station controller 30 is called a "base station subsystem (BSS)".

The access point 40 is a medium for access of a wireless terminal to the WLAN. The access point 40 also transmits a signal of a supportable reception power to the wireless terminal 10.

CISr 50 performs an A9/A11 signaling in the WLAN in combination with a mobile communication network (e.g. CDMA2000) signaling gateway (CSG) of the wireless terminal. Also, the CIS 50 connects with an AAA (Authentication, Authorization, and Accounting) server 90 for authentication in the case of access to the WLAN.

The packet control function 60 has no dormant state in the case of access to the WLAN. Also, the packet control function 60 notifies the packet data service node 70 of information about a network to which the wireless terminal 10 has been connected.

The packet data service node 70 is connected to an IP network, and performs accounting and PPP operations which differ depending on whether the wireless terminal 10 selects the interface of the mobile communication network or the interface of the WLAN. Also, the packet data service node 70 performs an account client function for the mobile communication network and WLAN.

The AAA server 90 performs authentication, authorization, and accounting functions, and connects with the CIS 50 for authentication in the case of access to the WLAN.

A data server 100 stores multimedia data or content data, and provides corresponding data to the user as required by the user.

An IP network 110 connects the packet data service node 70 to the AAA server 90 and the data server 100 so as to act as a path for transmitting/receiving authentication information, authorization information, and accounting information, and corresponding data.

Figure 2:
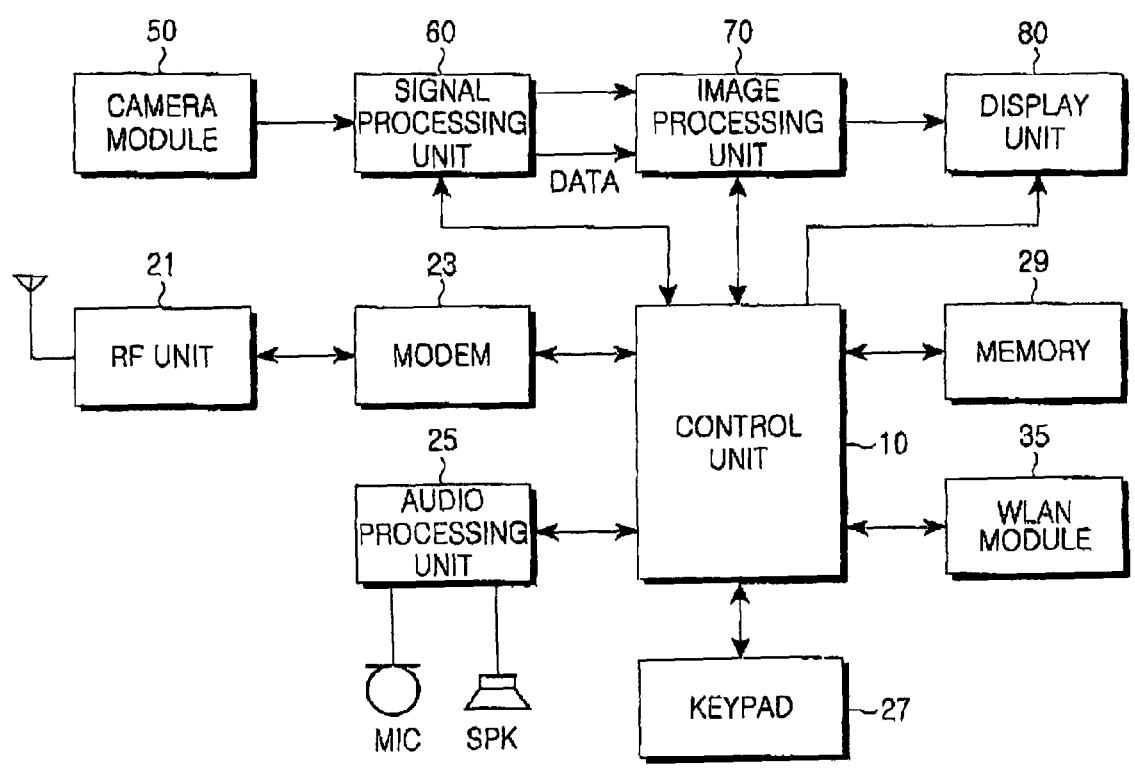
FIG. 2 is a block diagram illustrating the construction of a wireless terminal according to the present invention.

FIG. 2 is a block diagram illustrating the entire construction of a wireless terminal according to the present invention. The construction of a wireless terminal capable of performing selection between the interface of the mobile communication network and the interface of the WLAN according to the present invention will now be described with reference to FIG. 2. An RF unit 21 performs the communication function of the wireless terminal. The RF (Radio Frequency) unit 21 includes an RF transmitter and an RF receiver, in which the RF transmitter up-converts and amplifies the frequency of a signal to be transmitted, and the RF receiver low-noise amplifies a received signal and down-converts the frequency of the received signal. The RF unit 21 also receives a signal at a predetermined reception power level from the base transceiver subsystem 20 of the mobile communication network, and receives a signal at a predetermined reception power level from the access point 40 of the WLAN.

A modem 23 includes a transmitter for encoding and modulating the signal to be transmitted and a receiver, for demodulating and decoding the received signal.

An audio processing unit 25 may include a codec, which contains a data codec for processing packet data and an audio codec for processing an audio signal. The audio processing unit 25 converts a digital audio signal received by the modem 23 into an analog signal by means of the audio codec, thereby reproducing the converted analog signal. Also, the audio processing unit 25 converts an analog audio signal for transmission generated from a microphone into a digital audio signal by means of the audio codec, and transmits the converted digital audio signal to the modem 23. The codec may be separately constructed, or may be included in a controller 10.

A key input unit 27 includes keys for inputting numeral and character information and function keys for setting various functions.

A memory 29 may include a program memory and a data memory. The program memory may store programs for controlling general operations of the mobile terminal. Also, the data memory temporarily stores data generated while the programs are being executed. In addition, the program memory stores a program for calculating each guaranteed datarate by using each reception power received from different types of networks, and a program for calculating a network selection factor value by using each calculated guaranteed datarate. The data memory also stores a minimum guaranteed datarate, a data rate according to types of data, a minimum satisfaction rate according to types of data, and information about a cost per packet of each network.

A WLAN module 35 is a module capable of wirelessly communicating with a wireless fidelity (Wi-Fi) based on the Institute of Electrical and Electronics Engineers (IEEE) 802.11 standard, with an AP based on the IEEE 802.16 Wireless Broadband Internet (WiBro) protocol, or with an AP based on the IEEE 802.20 protocol. The WLAN module 35 may be equipped in the form of a wireless LAN card.

The controller 10 controls the entire operation of the mobile terminal. The controller 10 may include the modem 23 and the codec. According to the present invention, when having received a signal at a predetermined reception power signal from one or more communication networks, the controller 10 controls a guaranteed datarate of each communication network to be calculated by using the reception power of the received signal, and compares the calculated guaranteed datarate with a minimum guaranteed datarate. As a result of the comparison, when the guaranteed datarates of all communication networks are equal to or greater than the minimum guaranteed datarate, the controller 10 controls a selection factor value of each communication network to be calculated by using each corresponding guaranteed data rate. Then, the controller 10 controls a communication network having the lowest selection factor value to be selected based on a result of the calculation. In contrast, when the guaranteed datarate of only a specific communication network is equal to or greater than the minimum guaranteed datarate, the controller 10 controls the specific communication network to be selected.

A camera module 50 photographs an image, and includes a camera sensor which converts an optical signal into an electric signal. Herein, it is assumed that the camera sensor is a CCD sensor.

A signal processing unit 60 converts an image signal output from the camera module 50 into an image signal. Herein, the signal processing unit 60 may include a digital signal processor (DSP).

An image processing unit 70 performs a function to generate image data for displaying an image signal output from the signal processing unit 60. The image processor 70 adjusts image signals received under the control of the control unit 10 to conform to the features, such as size and resolution, which are displayable on a display unit 80, and outputs the adjusted image data. The image processor 70 compresses the image data or restores the compressed image data to the original image data. In addition, the image processor 70 transmits a start address value of the image data outputted to the display unit 80, and changes the start address value and sends the changed value under the control of the control unit 10.

The display unit 80 displays image data output from the image processing unit 70. Herein, the display unit 80 may employ an LCD. When employing the LCD, the display unit 80 may include an LCD controller, a memory for storing image data, an LCD display element, etc. Herein, when the LCD is realized in a touch screen scheme, a keypad 27 and the LCD may serve as an input section. Also, the display unit 80 includes an image data display section for displaying image data.

The operation of the wireless terminal will now be described with reference to FIG. 2. In the case of an outgoing mode, when a user selects an outgoing mode after performing a dialing operation using the keypad 27, the control unit 10 the dialing operation senses it, processes the dial information received through the modem 23, converts the dial information into an RF signal through the RF unit 21, and then outputs the RF signal. Thereafter, when a response signal is generated from a called subscriber, the controller 10 senses the response signal through the RF unit 21 and the modem 23. Then, a voice communication channel is formed by the audio processing unit 25, so that it, is possible for the user to communicate with the called subscriber. Also, in the case of an incoming mode, the control unit 10 senses that the mobile terminal is in the incoming mode by the modem 23, and generates a ring signal by the audio processing unit 25. Thereafter, when the user selects a response to the ring signal, the control unit 10 senses the response and forms a voice communication channel by the audio processing unit 25, so that it is possible for the user to communicate with a calling subscriber. Although voice communication in the incoming and outgoing call modes has been described, the control unit 10 can also perform data communications to receive or transmit packet data or image data. In addition, during a waiting mode or a character communication mode, the control unit 10 displays character data processed by the modem 23 on the display unit 80.

The operation for selecting a communication network by the wireless terminal will now be described. When having received one or more signals of predetermined reception power levels from one or more communication networks through the RF unit 21 and/or WLAN module 35 in a waiting state or power-on state, the controller 10 controls a guaranteed datarate of each communication network to be calculated using the reception powers of the received signals by controlling the memory 29, and compares the calculated guaranteed datarate with a minimum datarate. As a result of the comparison, when the guaranteed datarate of all communication networks are equal to or greater than the minimum guaranteed datarate, the controller 10 controls a selection factor value of each communication network to be calculated using each corresponding guaranteed datarate by controlling the memory 29. Then, the controller 10 controls a communication network having the lowest selection factor value to be selected.

Figure 3:
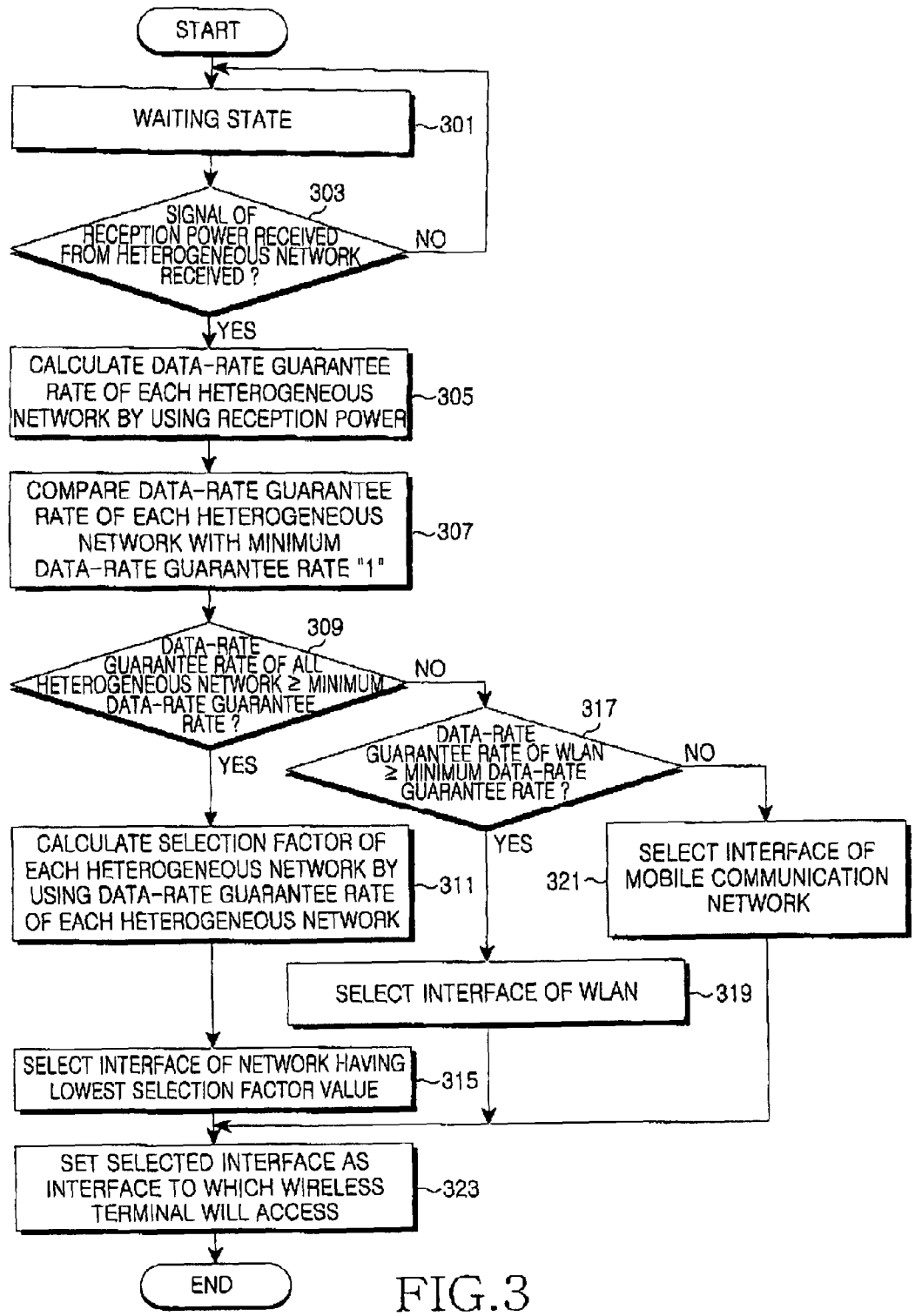
FIG. 3 is a flowchart illustrating the operation for selecting a communication network by the wireless terminal according to the present invention.

FIG. 3 is a flowchart illustrating the operation for selecting a communication network by the wireless terminal according to the present invention. The following description provides the operation for selecting an efficient communication network as a communication network, to which the wireless terminal will access, in a heterogeneous network environment including different types of communication networks with reference to FIG. 3. In a waiting state or power-on state (step 301), when having received signals at predetermined reception power levels from a mobile communication network and a WLAN, which are included in a heterogeneous network environment, through the RF unit 21 and/or WLAN module 35, the controller 10 senses the signals in step 303 and proceeds to step 305. In step 305, the controller 10 calculates each guaranteed datarate using the reception powers of the signals received from the mobile communication network and WLAN by controlling the memory 29.

The method for calculating each guaranteed datarate by using the reception power of each corresponding signal will now be described in detail with reference to Equation (2).

$$Q(i) = D\max(i)/(D\text{req} \times CBW(i)) \tag{2}$$

Equation (2) is used to calculate a data-rate guarantee rate of a corresponding network, in which "Dmax(i)" represents the maximum data rate, i.e., a value of the reception power which can be supported by an $i^{th}$ network. Also, "Dreq (required data rate)" represents a data rate required by the user. For example, the "Dreq" has a value of 384 kbps for video data and has a value of 64 kbps for audio data, in which the required data rate has a fixed value. Also, "CBW (critical bandwidth) (i)" represents a minimum satisfaction rate at which the user starts to be satisfied in the $i^{th}$ network. For example, if the user is not satisfied when a data rate for video data is less than 300 kbps, the value of the CBW becomes 0.78 from "300 kbps/384 kbps". Also, "Q(i)" represents a datarate when the $i^{th}$ network is used. When the value of a datarate "Q" is less than the minimum guaranteed datarate, data transmission cannot be guaranteed. In contrast, when the value of a guaranteed datarate "Q" is equal to or greater than the minimum guaranteed datarate, a high quality of data transmission can be guaranteed.

After having calculated each guaranteed datarate by using Equation (2), the controller 10 compares each guaranteed datarate with the minimum guaranteed data-rate by controlling the memory 29 (step 307). Herein, the minimum guaranteed datarate is a reference for determining if data transmission is guaranteed, and the minimum guaranteed datarate, for example, may have a value of "1".

When it is determined as a result of the comparison that the guaranteed data-rates of all the heterogeneous networks (i.e. the mobile communication network and WLAN) are equal to or greater than the minimum guaranteed datarate (e.g. "1"), the controller 10 senses it in step 309 and proceeds to step 311. In step 311, the controller 10 calculates selection factors of the mobile communication network and WLAN using the guaranteed datarates of the heterogeneous networks, that is, the guaranteed data-rate of the mobile communication network and WLAN, and then proceeds to step 315.

The operation for calculating a selection factor by using each guaranteed datarate will now be described in more detail with reference to Equation (3)

$$S(i)=Q(i)\times COSTi \quad (3)$$

In Equation (3), "Q(i)" represents the guaranteed datarate when an $i^{th}$ network is used, and "COSTi" represents an average cost per packet when the $i^{th}$ network is used. Also, "S(i)" represents a selection factor of the $i^{th}$ network. As the "S(i)" has a greater value, a greater cost is imposed for usage of the same data.

After having calculated the selection factors of the mobile communication network and WLAN by using Equation (3), the controller 10 selects one communication network (i.e. the interface of one communication network) having a lowest selection factor value, from among the at least one communication network, that is, from among the mobile communication network and the WLAN (step 315).

When it is determined as a result of the comparison in step 307 that only the guaranteed datarate of the WLAN of the guaranteed datarate of the heterogeneous networks (i.e. the mobile communication network and WLAN) is equal to or greater than the minimum guaranteed datarate (e.g. "1"), the controller 10 senses it in step 317 and proceeds to step 319. In step 319, the controller 10 selects the WLAN, that is, the interface of the WLAN.

When it is determined as a result of the comparison in step 307 that only the guaranteed datarate of the mobile communication network of the guaranteed datarates of the heterogeneous networks (i.e. the mobile communication network and WLAN) is equal to or larger than the minimum guaranteed data-rate (e.g. "1"), the controller 10 proceeds to step 321, in which the controller 10 selects the mobile communication network, that is, the interface of the mobile communication network.

In contrast, when the guaranteed datarates of all the heterogeneous networks (i.e. the mobile communication network and WLAN) are less than the minimum guaranteed datarate (e.g. "1"), the controller 10 returns to step 301 in which the controller 10 waits for a signal of a reception power.

After having selected a corresponding communication network (i.e. the interface of a corresponding communication network) through the above-mentioned procedure, the controller 10 proceeds to step 323. In step 323, the controller 10 sets the selected communication network (i.e. the interface of the selected communication network) as a communication network to which the wireless terminal will access (i.e. as the interface of a communication network to which the wireless terminal will access). Herein, the term "a communication network to which the wireless terminal will access (i.e. interface of a communication network to which the wireless terminal will access)" represents a communication network (i.e. interface of a communication network) used to transmit and receive a request signal, a response signal, data, and/or contents when the user requests that the data server 100 provide a multimedia service.

As described above, according to the method of the present invention, one communication network of one or more heterogeneous networks is selected by using a guaranteed datarate and a selection factor value, which have been calculated using the reception powers provided from the heterogeneous networks, so that it is possible to automatically select a communication network imposing a lower cost while guaranteeing the minimum data rate to satisfy the user.

While the present invention has been shown and described with reference to certain preferred embodiments thereof, it will be understood by those skilled in the art that various changes in form and details may be made therein without departing from the spirit and scope of the invention as defined by the appended claims. Particularly, it will be clear to those skilled in the art that the heterogeneous networks employed in the present invention may include not only the mobile communication network and WLAN but also a local area network, wireless Internet, and all packet data networks. Accordingly, the scope of the invention is not to be limited by the above embodiments but by the claims and the equivalents thereof.

What is claimed is:

1. A method for selecting a communication network by a wireless terminal, comprising the steps of:
    receiving a signal having a predetermined reception power level from one or more communication networks, and calculating a guaranteed data rate of each of said one or more communication networks by using the predetermined reception power level of the signal;
    comparing the calculated guaranteed data rate with a minimum guaranteed data rate; and
    calculating a selection factor value of each of said one or more communication networks by using the guaranteed data rate when all guaranteed data rates of said one or more communication networks are equal to or greater than the minimum guaranteed data rate, and selecting a communication network having a lowest selection factor value.

2. The method as claimed in claim 1, further comprising selecting a specific communication network when only the guaranteed data rate of the specific communication network of the guaranteed data rates of said one or more communication networks is equal to or greater than the minimum guaranteed data rate.

3. The method as claimed in claim 1, wherein the guaranteed data rate is calculated by:

$$Q(i) = D\max(i)/(Dreg \times CBW(i))$$

where "Q(i)" represents a data rate guarantee rate when an $i^{th}$ network is used, "Dmax(i)" represents a maximum data rate which can be supported in the $i^{th}$ network, "Dreg (required data rate)" represents a data rate required by the user, and "CBW (critical bandwidth) (i)" represents a minimum satisfaction rate at which the user starts to be satisfied in the $i^{th}$ network.

4. The method as claimed in claim 1, wherein the selection factor value of said one or more communication networks is calculated by:

$$S(i) = Q(i) \times COSTi$$

where "S(i)" represents a selection factor of an $i^{th}$ network, "Q(i)" represents a guaranteed data rate when the $i^{th}$ network is used, and "COSTi" represents an average cost per packet when the $i^{th}$ network is used.

5. The method as claimed in claim 1, further comprising setting the selected communication network as a communication network to which the wireless terminal will access.

6. The method as claimed in claim 1, wherein said one or more communication networks include a mobile communication network and a wireless local area network (WLAN).

7. A method for selecting a communication network by a wireless terminal, comprising the steps of:

receiving signals having predetermined reception power levels from a mobile communication network and a wireless local area network (WLAN), and calculating guaranteed data rates of the mobile communication network and the WLAN by using the predetermined reception power levels of the signals;

comparing the calculated guaranteed data rates with a minimum guaranteed data rate;

calculating selection factor values of the mobile communication network and the WLAN by using the guaranteed data rates, when it is determined as a result of the comparison that the guaranteed data rate of the mobile communication network and the WLAN are equal to or greater than the minimum guaranteed data rate; and selecting one communication network having a lower selection factor value based on a result of the selection factor value calculation, and setting the one communication network as a communication network to which the wireless terminal will access.

8. The method as claimed in claim 7, further comprising:

selecting the WLAN when it is determined as a result of the comparison that only the guaranteed data rate of the WLAN of the guaranteed data rates of the two networks is equal to or greater than the minimum guaranteed data rate;

selecting the mobile communication network when it is determined as a result of the comparison that only the guaranteed data rate of the mobile communication network is equal to or greater than the minimum guaranteed data rate; and waiting for the reception power signal to be received again when it is determined as a result of the comparison that the guaranteed data rates of the mobile communication network and the WLAN are less than the minimum guaranteed data rate.

9. The method as claimed in claim 7, wherein the guaranteed data rate is calculated by $$Q(i) = D\max(i)/(Dreq \times CBW(i))$$

where "Q(i)" represents a guaranteed data rate datarate when an $i^{th}$ network is used, "Dmax(i)" represents a maximum guaranteed data rate which can be supported in the $i^{th}$ network, "Dreq (required data rate)" represents a data rate required by a user, and "CBW (critical bandwidth) (i)" represents a minimum satisfaction rate at which the user starts to be satisfied in the $i^{th}$ network.

10. The method as claimed in claim 7, wherein the selection factor values of the communication networks are calculated by $$S(i) = Q(i) \times COSTi$$

where "S(i)" represents a selection factor of an $i^{th}$ network, "Q(i)" represents a guaranteed data rate data rate when the $i^{th}$ network is used, and "COSTi" represents an average cost per packet when the $i^{th}$ network is used.

* * * * *